United States Patent [19]

Rabatin

[11] 3,996,472
[45] Dec. 7, 1976

[54] THERMOLUMINESCENT MATERIALS UTILIZING RARE EARTH OXYHALIDES ACTIVATED WITH TERBIUM

[75] Inventor: Jacob G. Rabatin, Chardon, Ohio
[73] Assignee: General Electric Company, Schenectady, N.Y.
[22] Filed: Apr. 7, 1975
[21] Appl. No.: 565,642
[52] U.S. Cl. .............................. 250/484; 250/338; 252/301.4 H
[51] Int. Cl.² ........................................ H05B 33/00
[58] Field of Search ............. 252/301.4 H, 301.4 F; 250/484, 483, 338

[56] References Cited
UNITED STATES PATENTS

| | | | |
|---|---|---|---|
| 3,617,743 | 11/1971 | Rabatin | 250/484 |
| 3,666,676 | 5/1972 | Rabatin | 252/301.4 H |
| 3,738,856 | 6/1973 | Masi | 250/483 |
| 3,767,588 | 10/1973 | Otomo et al. | 252/301.4 H |
| 3,905,912 | 9/1975 | Mathers | 252/301.4 H |

*Primary Examiner*—Harold A. Dixon
*Attorney, Agent, or Firm*—John F. McDevitt; Lawrence R. Kempton; Frank L. Neuhauser

[57] ABSTRACT

Thermoluminescent materials have been found suitable for measuring long term exposures to low level ionizing radiation. Oxyhalides of lanthanum, gadolinium and yttrium, including the oxychlorides and oxybromides are activated with terbium and have been found to be most efficient oxygendominated phosphors having thermoradiant efficiencies with excitation by low level ionizing radiation. Thermoluminescence response increases when the previous materials have hafnium and zirconium additives.

5 Claims, 2 Drawing Figures

Thermoluminescence of LaOBr:.05 Tb.0005 Zr

Thermoluminescence of LaOBr:.05 Tb

Thermoluminescence of LaOBr:.05Tb.0005Zr

THERMOLUMINESCENT MATERIALS UTILIZING RARE EARTH OXYHALIDES ACTIVATED WITH TERBIUM

BACKGROUND OF THE INVENTION

1. Field of the Invention

The present invention relates to thermoluminescent materials, and more particularly to such materials characterized as rare earth oxyhalides, activated with terbium. The invention also relates to a thermoluminescent dosimeter which utilizes the proportional relationship between the relative intensity of the emitted light and the dose of ionizing radiation.

2. Brief Description of the Prior Art

U.S. Pat. No. 3,617,743, issued to the present inventor, relates to luminescent materials categorized as rare earth oxyhalides activated with terbium utilized in an X-ray image converter. The materials disclosed in this patent were found to produce phosphors that are highly efficient light producers under cathode ray, ultraviolet and X-ray excitation. By luminescence, it is meant that light is emitted in response to any of these excitations. Subsequent to the development of the materials disclosed in the mentioned patent, it has been discovered that rare earth oxyhalides activated with terbium also have the capability of acting as thermoluminescent materials. By this, it is meant that luminescence takes place upon heating of the materials, after such materials have been exposed to ionizing radiation. As such, the presently disclosed materials serve as excellent radiation dosimeters.

In the past, radiation dosimeters have included X-ray film which became exposed when subjected to ionizing radiation. In order to determine the extent of radiation, the X-ray film had to be developed. Obviously, this requirement of development creates inconvenient and inefficient dosimetry.

BRIEF DESCRIPTION OF THE PRESENT INVENTION

The present invention relates to novel thermoluminescent (TL) materials, especially suitable for use in measuring long term exposures to low level ionizing radiation such as that found in medical radiography and nuclear power plant operations. Because of the hazards for persons exposed to ionizing radiation and because of rigid safety standards, it is necessary to measure exposure dosages accurately. The method of TL dosimetry (TLD) is being increasingly used for these purposes. The method is based on the fact that a thermoluminescent material contains defects or impurity atoms which can trap electrons or positive holes at metastable energy levels when the material is subjected to ionizing radiation. On heating the material, the trapped metastable entities return to the normal ground state thereby emitting visible radiation called thermoluminescence. TLD utilizes the proportional relationship between the relative intensity of the emitted light and the dose of ionizing radiation. Suitable readout devices have been constructed which can measure the amount of emitted light and relate this to roentgens of radiation exposure. The relationship between the light emitted by a thermoluminescent material and the temperature of the material as the material is heated at a constant rate is represented by the so-called glow curves, to be discussed hereinafter. The advantages mentioned above are some of the reasons why thermoluminescence is rapidly becoming one of the more common methods to measure ionizing radiation for such applications as clinical measurments of dosages in radiotherapy and monitoring of personnel at various medical, industrial and government installations dealing with sources of ionizing radiation. TLD capable of measuring low levels of exposure below 1 mR are important in some health physics applications. The need for low level environmental monitoring around nuclear installations is increasing as more and more nuclear power generators are installed.

DETAILED DESCRIPTION OF THE INVENTION

The thermoluminescent materials of the present invention are expressed by the following general formula:

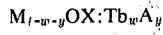

$$M_{1-w-y}OX:Tb_wA_y$$

wherein M is an element selected from the group consisting of La, Gd and Y. X is an element selected from the group consisting of Cl and Br. A is an element selected from a group consisting of Zr and Hf. $w$ is from 0.005 to 0.30 mole per mole of the selected oxyhalide. $y$ is from zero to 0.01 mole per mole of the selected oxyhalide.

Figure 1:
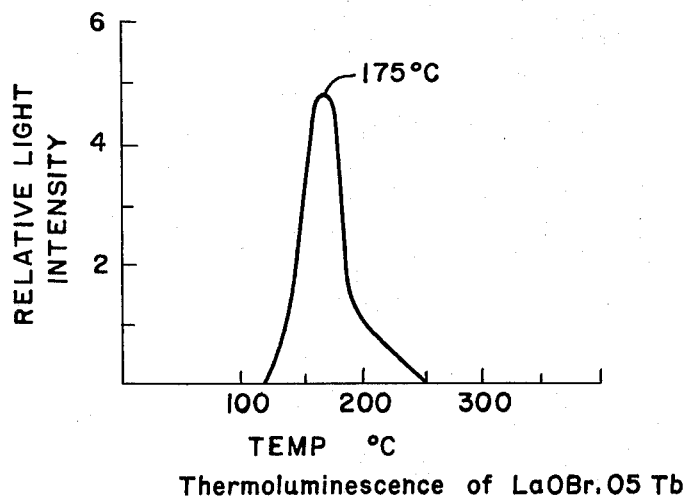
FIG. 1 is a glow curve illustrating thermoluminescence of LaOBr0.05 Tb.
Figure 2:
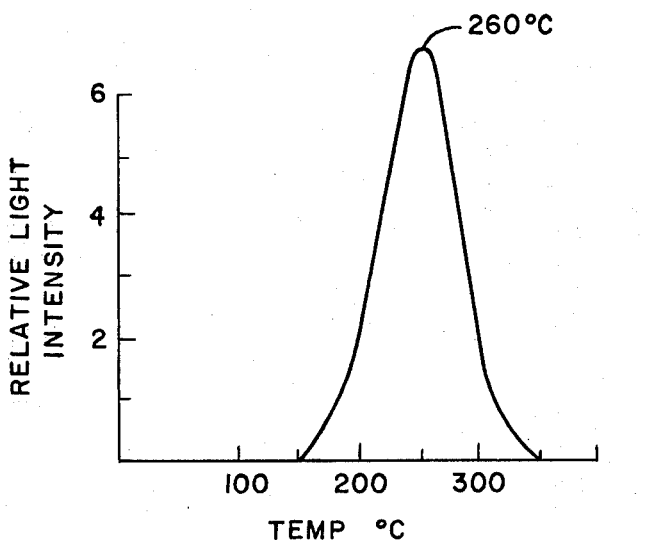
FIG. 2 is a glow curve illustrating thermoluminescence of LaOBr:0.05 Tb 0.0005 Zr.

Typical glow curves for LaOBr0.05 Tb and LaOBr0.05 Tb 0.0005 Zr are shown in FIGS. 1 and 2, respectively. The integrated light intensities for the curves are proportional to the dose of ionizing radiation. The peak outputs are shown for the heating rates of about 10° C per second. Note that with the addition of zirconium (FIG. 2) the glow curve peak has shifted to about 260° C indicating deeper, more stable traps. The TL sensitivity has also increased by about 200%. Both features are desirable for TLD measurements of low intensity, long term radiation exposures. Typically, data for the glow curves may be derived by utilizing 35 mg samples of the thermoluminescent materials which are first irradiated on a 5 mil stainless steel strip heater with X-ray exposure for 10 seconds at 1.0 ma and 90 $KV_p$. The heating rate may be approximately 10° C per second. The glow curves may be recorded by a stored image oscilloscope utilizing a photomultiplier set at 1400 V. The areas under each glow curve is measured and is expressed as mv-sec. In the plots of FIG. 1 and FIG. 2, no corrections were made for differences in X-ray absorption between the materials.

The present invention provides a material for thermoluminescent dosimetry which has a very high sensitivity to ionizing radiations and a very stable retention of absorbed radiation for long term applications. Table I compares the relative TLD response of several materials when irradiated with 90 $KV_p$ X-rays. Also are included the principal TL glow peak temperatures and storage losses after irradiation. The first five samples are commercial TL materials obtained from the Harshaw Chemical Company. In accordance with the previously mentioned data gathering procedure, 35 mg size samples were irradiated for 10 seconds at 90 $KV_p$ and at 1.0 ma. The readouts were at 10° C per second heating rates. The glow curves were recorded by a stored image oscilloscope. The integrated areas under the curves are reported in Table I as millivolt-seconds. The glow curve peak temperatures were determined from calibration curves of TL materials whose glow peak temperatures are known.

TABLE I

Relative TLD Response of Several Materials under 90 KVp X-radiation

| Composition | Main TL Peak | Relative Sensitivity mv-sec | Storage Loss |
|---|---|---|---|
| LiF | 190° C | 1.0 | 5%/3mo. |
| CaSO$_4$:Mn | 110 | 360 | 7%/hr |
| CaSO$_4$:Dy | 230 | 140 | stable |
| CaF$_2$:Mn | 260 | 16 | stable |
| CaF$_2$:Dy | 180 | 80 | stable |
| LaOBr.02 Tb | 180 | 630 | 5%/mo. |
| LaOBr.05 Tb.0005 Zr | 260 | 1800 | stable |
| LaOBr.05 Tb.001 Hf | 260 | 3000 | stable |
| LaOBr.05 Tb | 180 | 750 | — |
| GdOBr.05 Tb .001 Zr | 275 | 330 | stable |

The data in Table I clearly establishes the superior nature of rare earth oxyhalides as TLD materials when terbium and zirconium and, or hafnium are present in the host structure. Compared to LiF, the most commonly used TLD material, the increased sensitivities are as much as 3000 times greater. Compared to CaSO$_4$:Mn the most sensitive commercial material, the materials of the present invention are up to eight times more sensitive and very importantly are much more stable. CaSO$_4$:Mn can be used only in applications where readouts are done within a few hours after irradiation.

The thermoluminescent materials of the present invention are expressed by the following general formula:

$$M_{1-w-y}OX:Tb_wA_y$$

wherein M is an element selected from the group consisting of La, Gd and Y. X is an element selected from the group consisting of Cl and Br. A is an element selected from a group consisting of Zr and Hf. w is from 0.005 to 0.30 mole per mole of the selected oxyhalide. y is from zero to 0.01 mole per mole of the selected oxyhalide. These materials can be suitably prepared by a method previously described ino U.S. Pat. No. 3,591,516.

An example of the preparation of the thermoluminescent materials is described below for the formulation:

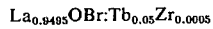
$$La_{0.9495}OBr:Tb_{0.05}Zr_{0.0005}$$

136 gm Tb$_4$O$_7$, 1.54 gm Zr(NO$_3$)$_4$0.5 H$_2$O and 2330 gms La$_2$O$_3$ are dissolved in 3.05 liters of concentrated HNO$_3$. After dilution to 18.3 liters, there are added 50 liters of 10% oxalic acid to precipitate the mixed oxalates. After filtration and washing, the oxalate cake is fired for 2 hours at 1000° C to reform the oxides. 2230 gms of the oxides are blended with 1440 gms of NH$_4$Br and fired for 2 hours at 400° C in a covered silica container. This fired material is then blended with 531 gms of KBr and refired for 2½ hours at 1000° C. The recrystallized oxyhalide powder is washed free of KBr, dried and pulverized for final use. The thermoluminescent material thus prepared shows very strong thermoluminescence with a glow peak at 260° C as is shown in FIG. 2 when irradiated with 90KV$_p$X-radiation. The intensity of thermoluminescence has a nearly linear relationship for exposures between about 10$^{-4}$R to 10$^3$R. The thermoluminescent material according to the present invention can be used as a thermoluminescent dosimeter to detect and measure exposure dosages of X-rays, gamma rays, ultraviolet radiation, electron beams and for the gadolinium oxyhalides, also neutron beams.

Although the above example of preparation is limited to the rare earth La, the halogen Br, and the additive Zr, analogous processes are used to prepare the oxychloride of lanthanum as well as the oxyhalides of gadolinium and yttrium with appropriate terbium activation, with suitable adjustments for atomic weight. Similarly, the preparation of the thermoluminescent materials can be adjusted for the additive hafnium.

The effect of terbium concentration on the TL response of LaOBr:Tb..0005Zr is shown in Table II. The TL response increases nearly linearily as the terbium concentration is increased. The maximum response occurs at about a composition of LaOBr0.15 Tb. Thereafter the response begins to slowly decrease as the phosphor efficiency decreases.

TABLE II

Effect of Tb Concentration on TL Response of LaOBr:Tb.0005 Zr

| Moles Tb | Temp. ° C of Main Glow Peak | TL Response mv-sec |
|---|---|---|
| .005 | 260°C | 400 |
| .05 | 260°C | 1200 |
| .10 | 260°C | 2000 |
| .15 | 260°C | 3200 |

The main glow peak temperature is essentially unaffected by terbium concentration.

The effect of zirconium concentration on the TL response of LaOBr0.05 Tb:Zr is shown in Table III. The principal effect is to increase the main glow peak from about 180° to about 260° C. The TL response also increases. At higher zirconium concentrations, above about 0.002 moles Zr per mole of oxyhalide, the TL response begins to decrease in intensity.

TABLE III

Effect of Zr Concentration on Glow Peak and TL Response of LaOBr.05 Tb:Zr

| Mole Zr | Main TL Peak Temp. ° C | TL Response mv-sec |
|---|---|---|
| none | 180°C | 600 |
| .0005 Zr | 260°C | 1200 |
| .005 Zr | 260°C | 800 |

The relative TL response of several commercial TL materials and LaOBr0.02 Tb are shown in Table IV for exposures to about 5 R of 0.66 MeV gamma radiation from a Cs$^{137}$ source. The relative absorption coefficients for this energy are not greatly different for various elements and thus the relative efficiencies of various TL materials are directly comparable. LaOBr0.02 Tb is at least 34 times more responsive to these gamma rays than is LiF.

TABLE IV

Relative TL Responses of Various Materials under 5 R Exposure of 0.66 MeV Gamma Radiation from Cs$^{137}$

| TLD Material Composition | Relative Response mv-sec |
|---|---|
| LiF | 1.0 |
| CaF$_2$:Dy | 16.0 |
| CaSO$_4$:Dy | 10.0 |
| CaF$_2$:Mn | 4.0 |
| LaOBr.02 Tb | 34.0 |

TLD is also important in detecting thermal neutrons. To date, mostly $Li^6F$ has been used. One requirement for thermal neutron dosimetry is that the materials have a high cross section capture sigma for neutrons. In this respect $Li^6$ has a sigma of about 945 barns as compared to natural Gd which has a sigma of about 46,000 barns. Considering that, in general, the TL efficiencies of materials for any radiation are, in part, related to the amount of radiation absorbed and are related also to the relative TL efficiencies for other radiation, the relative TL efficiencies for thermal neutrons can be roughly extrapolated from relative TL efficiencies under X-ray or gamma excitation and from neutron capture data.

A comparison of estimated TLD responses of various materials under thermal neutron irradiation is tabulated in Table V, which follows.

TABLE V

| Composition | Rel Sen. $Cs^{137}$ ex. | Calc. Rel. Sen. Thermal Neutron |
|---|---|---|
| $Li^6F$ | 1.0 | 1.0 |
| GdOBr.005Tb | 5 | 250 |
| $GdBO_3$.02 Dy | 2 | 100 |

An additional advantage for the use of GdOBr:Tb over $Li^6F$ is that the GdOBr:Tb has a relatively low sensitivity for X or gamma rays. Since neutrons are almost always associated with gamma radiation, the use of LaOBr:Tb to detect gamma rays together with GdOBr:Tb can be made to give higher discrimination between the types of radiation as compared to $Li^7F$ and $Li^6F$ which are currently used. Also no isotope separations are needed for Gd as compared to $Li^6$. Also because of the very high cross section for thermal neutrons, it may be possible to detect fast neutrons by incorporation of a moderator.

From Table II it is apparent that the terbium concentration does not appear to be critical. Apparently, the energy trapping sites are associated with the host crystal and not with the activator. The function of Tb is to serve as a mode of luminescence once the sites are thermally emptied. Several impurities in PPM amounts are harmful to TL response either (1) by introducing shallow traps; these include Ti, Nd, Th, Pr, Sm, Ce, or (2) by reducing TL response; these include U, Yb, Eu, Dy. As indicated in Table I, the utilization of zirconium and hafnium increases the trap depths from about 180° to 250°–270° C range. This increased TL stability is highly desirable in certain applications where low level ionizing radiation exposures are monitored for many months as in the cases for nuclear power plants.

It should be understood that the invention is not limited to the exact details of construction shown and described herein for obvious modifications will occur to persons skilled in the art.

What is claimed as new and desired to be secured by Letters Patent of the United States is:

1. A thermoluminescent material comprising crystals of a material essentially according to the formula:

$$M_{l-w-y}OX:Tb_wA_y$$

wherein
   M is an element selected from the group consisting of La, Gd and Y;
   X is an element selected from the group consisting of Cl and Br;
   A is an element selected from a group consisting of Zr and Hf;
   w is from 0.005 to 0.30 mole per mole of the selected oxyhalide;
   and y is from zero to 0.01 mole per mole of the selected oxyhalide.

2. Thermoluminescent material according to claim 1 wherein M is lanthanum and X is bromine.

3. A method for measuring exposures to ionizing radiation comprising the steps;
   exposing a thermoluminescent material to the ionizing radiation, the material generally characterized as a rare earth oxyhalide activated with terbium;
   heating the exposed material until visible light is emitted therefrom; and
   measuring the emitted light which is proportional to the dose of ionizing radiation.

4. A method, directed to a new use of a rare earth oxyhalide, activated with terbium, for measuring exposures to ionizing radiation, the activated oxyhalide essentially expressed by the formula:

$$M_{l-w-y}OX:Tb_wA_y$$

wherein
   M is an element selected from the group consisting of La, Gd and Y;
   X is an element selected from the group consisting of Cl and Br;
   A is an element selected from a group consisting of Zr and Hf;
   w is from 0.005 to 0.30 mole per mole of the selected oxyhalide;
   and y is from zero to 0.01 mole per mole of the selected oxyhalide;
   and further wherein the activated oxyhalide produces measurable visible light, when heated, in proportion to the dose of ionizing radiation.

5. The method of claim 4 wherein M is lanthanum and X is bromine.

* * * * *